US012676252B2

(12) United States Patent  
Carrolo Nuno et al.

(10) Patent No.: US 12,676,252 B2  
(45) Date of Patent: Jul. 7, 2026

(54) TAPING HEAD

(71) Applicant: APTIV MANUFACTURING MANAGEMENT SERVICES GMBH, Schaffhausen (CH)

(72) Inventors: José Lopes Carrolo Nuno, Lisbon (PT); Qiu Jianliang, Lisbon (PT); Marco Rubén Medeiros Ferreira da Silva, Odivelas (PT); Miguel Sousa Borges Monteiro Pires, Lisbon (PT)

(73) Assignee: APTIV MANUFACTURING MANAGEMENT SERVICES GMBH, Schaffhausen (CH)

( * ) Notice: Subject to any disclaimer, the term of this patent is extended or adjusted under 35 U.S.C. 154(b) by 244 days.

(21) Appl. No.: 18/382,757

(22) Filed: Oct. 23, 2023

(65) Prior Publication Data

US 2024/0136090 A1 Apr. 25, 2024  
US 2024/0233987 A9 Jul. 11, 2024

(30) Foreign Application Priority Data

Oct. 24, 2022 (EP) .................................... 22203260  
Mar. 9, 2023 (EP) .................................... 23161011

(51) Int. Cl.  
*H01B 13/012* (2006.01)  
*B25J 15/04* (2006.01)  
*B65H 35/00* (2006.01)

(52) U.S. Cl.  
CPC ... *H01B 13/01281* (2013.01); *B65H 35/0026* (2013.01); *B25J 15/0408* (2013.01); *B65H 2701/377* (2013.01)

(58) Field of Classification Search  
CPC ............ H01B 13/01281; H01B 13/012; H01B 13/01209; H01B 13/01263; B25J 15/0408; B25J 9/1694; B25J 9/0009; B25J 5/00–06; B65B 13/02; B65B 13/04; B65B 13/10; B65B 13/12; B65B 13/14; B65B 13/16  
See application file for complete search history.

(56) References Cited

U.S. PATENT DOCUMENTS

| | | | |
|---|---|---|---|
| 5,041,185 A | 8/1991 | Ohashi et al. | |
| 5,271,791 A | 12/1993 | Tanaka | |
| 9,242,832 B2 | 1/2016 | Word et al. | |
| 2011/0017392 A1 | 1/2011 | Erives | |

(Continued)

FOREIGN PATENT DOCUMENTS

| | | | | |
|---|---|---|---|---|
| CN | 108455356 A | 8/2018 | | |
| CN | 110444344 A * | 11/2019 | ....... | H01B 13/01281 |

(Continued)

OTHER PUBLICATIONS

Cited NPL Document No. 001: "Communication pursuant to Rule 114(2) EPC"; European Patent Office; mailed on Feb. 18, 2025; 15 Pages.

(Continued)

*Primary Examiner* — Carson Gross  
(74) *Attorney, Agent, or Firm* — Billion & Armitage

(57) ABSTRACT

A taping head for taping a wire harness with tape of a tape roll includes a base body and a rotatable tape dispenser with a mouth and mandrel for receiving the tape roll. The tape dispenser is configured to rotate the tape roll and is mounted to the base body by means of a quick-release coupling.

8 Claims, 6 Drawing Sheets

(56)     References Cited

U.S. PATENT DOCUMENTS

| | | | |
|---|---|---|---|
| 2015/0096688 A1 | 4/2015 | Word et al. | |
| 2019/0224858 A1* | 7/2019 | Hansen | B25J 15/0408 |
| 2021/0197401 A1* | 7/2021 | Weintraub | B25J 15/0483 |

FOREIGN PATENT DOCUMENTS

| | | | | |
|---|---|---|---|---|
| CN | 114776967 A | | 7/2022 | |
| DE | 4032511 A1 | | 4/1992 | |
| EP | 4174882 A1 | | 5/2023 | |
| EP | 4312232 A1 | | 1/2024 | |
| GB | 2141687 A | * | 1/1985 | ....... H01B 13/01281 |
| GB | 2620951 A | | 1/2024 | |
| JP | H0732239 A | * | 2/1995 | |
| WO | 03013958 A1 | | 2/2003 | |
| WO | 2022053112 A2 | | 3/2022 | |

OTHER PUBLICATIONS

Cited NPL Document No. 002: YouTube video "KT Robot Taping": (https://www.youtube.com/watch?v=QULhTNv90j0); Author: Komax Taping GmbH & Co. KG; duration 1:13; uploaded Nov. 29, 2021.

Cited NPL Document No. 003: YouTube video "Robotic Hand Changer: Auto-Taping System (with: Marugo Industries Inc.) (Robot : RS005L, KHI)" (https://www.youtube.com/watch?v=otbeX3prahA); Author: Kosmek, Ltd.; duration 2:03; uploaded Aug. 23, 2018.

Extended European Search Report for Application No. 23161011.4; mailed Nov. 29, 2023; 11 pages.

Office Action for EP Application No. 23 161 011.4; mailed Mar. 25, 2026, 11 pages.

\* cited by examiner

TAPING HEAD

CROSS-REFERENCE TO RELATED APPLICATION

This application claims the benefit of and priority to European Patent Application No. 22203260.9, filed Oct. 24, 2022, and further claims the benefit of and priority to European Patent Application No. 23161011.4, filed Mar. 9, 2023, the contents of each of which are incorporated by reference herein.

TECHNICAL FIELD OF THE INVENTION

The present disclosure relates to a taping head for taping a wire harness.

BACKGROUND

Taping heads for taping a wire harness with a protective and/or adhesive tape are generally known. Such taping heads are used to manually or automatically wrap a tape around a bundle of wires. In industrial applications there is a need to automatically apply the tape to different wire harnesses or to different sections of a wire harness. Although the taping process can be performed automatically, e.g., by means of a robot, an operator is still required to replace a depleted tape roll with a new tape roll. Therefore, at least one operator is dedicated to respectively one taping head, wherein the process time for replacing a tape roll is considerable because not only the tape roll has to be replaced but also the free end of a new tape roll must be manually guided along a predefined path within the tape dispenser.

Accordingly, there is a need to provide an improved taping head suitable for taping a wire harness with increased efficiency.

SUMMARY

The present disclosure provides a taping head for taping a wire harness with protective and/or adhesive tape of a tape roll, said taping head comprising a base body with a mouth for receiving the wire harness, and a rotatable tape dispenser with a mouth and with a mandrel for receiving the tape roll. The rotatable tape dispenser is rotatably mounted to the base body and configured to rotate the tape roll about a center of the mouths. The tape dispenser is mounted to base body by means of a quick-release coupling such that the tape dispenser can be connected and disconnected from the base body in a simple manner and a short period of time. This allows an operator to prepare a tape dispenser with a new tape roll in advance and to exchange this tape dispenser with the tape dispenser of the taping head having an empty tape roll in a very short period of time.

According to an embodiment, the quick-release coupling comprises a mounting plate that is rotatably fixed to the base body. The mounting plate can be rotated in relation to the base body and the mounting plate can be inserted in or connected to the tape dispenser to ensure a stable connection between the base body and the tape dispenser.

According to a further embodiment, the tape dispenser comprises a recess for receiving the mounting plate. A mounting plate receivable in the recess of the tape dispenser results in a firm and stable connection between the base body and the tape dispenser.

According to an embodiment, the quick-release coupling comprises a spring-loaded latch that is mounted to the tape dispenser. The latch can be used to interlock the tape dispenser and the base body wherein the spring serves to maintain the locked condition, in particular when the tape dispenser is rotating relative to the base body.

According to an embodiment, the taping head comprises a clamping unit configured to clamp a free end of the tape. The clamping unit may comprise an anvil fixedly mounted to the rotatable tape dispenser and a clamping element movably mounted to the base body. The anvil is not movable relative to the rotatable tape dispenser such that the tape can be firmly held between the anvil and the clamping element. However, the anvil is rotating together with the rotatable tape dispenser whereas the clamping element is not rotating with the rotatable tape dispenser but is movably mounted on the base body.

According to an embodiment the clamping element comprises a cutting blade. This provides the advantage that the free end of the tape can be cut and clamped with the clamping unit, i.e., with one and the same component. The cutting blade may comprise two cutting edges enclosing an obtuse angle of e.g., about 120°. Such design allows that an apex of the cutting blade cuts the tape at a location between the two outer edges of the tape to avoid a lateral shifting of the tape upon cutting.

According to an embodiment the anvil comprises a slot for receiving the cutting blade which improves the cutting and clamping of the free end of the tape. Since the anvil is not movable relative to the rotatable tape dispenser, the tape rests on the anvil and is also not moved when the cutting blade cuts the tape and enters the slot.

According to a further embodiment the clamping element moves between an open position and a closed position, wherein in the open position the tape is released by the clamping unit and wherein in the closed position the tape is cut and simultaneously clamped between the clamping element and the anvil. The clamping element may comprise a rotatable lever. The lever may be rotated to abut against the anvil for clamping and also cutting the tape end.

According to a further embodiment the lever is rotatable at least 180°. This allows the lever to rotate from one side of the base body to the opposing side where the tape dispenser is rotatably mounted. Thereby, a space in front of the anvil is not blocked by the clamping element which facilitates the handling of the taping head while taping. This promotes a compact design of the rotatable tape dispenser since the mechanism for actuating the clamping element is affixed to the base body rather than the rotatable tape dispenser.

According to a further embodiment the clamping unit comprises a gear rod and a gear wheel for rotating the clamping element. This also promotes a compact design since the gear rod can be actuated by means of a linear actuator without the necessity of a further electric motor for rotating the clamping element.

According to a further embodiment the tape dispenser comprises a spring-loaded receptacle for accommodating the wire harness. When positioning the taping head on the wire harness, the wire harness may be received in the receptacle and the taping head can be pushed against the wire harness without significantly deforming the wire harness. This allows a good positioning of the wire harness in the center of the mouths.

According to a further embodiment the spring-loaded receptacle forms a gap or slot for the tape. Thereby it is possible to feed the tape through the receptacle such that the tape can be positioned at the outer circumference of the wire harness when initiating the taping process.

According to a further embodiment a guide roll is located adjacent to the gap for guiding the tape, wherein the guide roll is rotatable about a first axis, in order to feed the tape into the gap on a substantially linear path. The guide roll may pivot about a second axis that is generally perpendicular to the first axis. The first axis may be oriented in parallel to an axis of rotation of the rotatable tape dispenser. Such designs result in a proper orientation and guidance of the tape if the taping head is moved along the length of a wire harness.

According to a further embodiment the receptacle for the wire harness has at least one wall that is concavely curved. Such contour corresponds to the outer contour of the wire harness and allows a safe positioning of the taping head next to the wire harness.

According to a further embodiment a contact surface of the anvil is located adjacent an inlet of the mouth of the tape dispenser. Thereby, it is possible to clamp the end of the tape in a position which is laterally shifted from the center of the mouth such as to avoid any undesired interference between the free end of the tape and the wire harness.

According to a further embodiment the anvil and the clamping element comprise a protrusion and a slit for clamping the tape therebetween. The anvil may comprise the protrusion and the clamping element may comprise the slit or vice versa. Both variants improve the clamping of the tape between the anvil and the clamping element.

According to a further embodiment the clamping element moves between an open position and a closed position, wherein in the closed position the clamping element secures the free end of the tape while the wire harness is located in the center of the mouths and wherein in the open position the clamping element releases the tape prior to rotation of the tape dispenser.

According to a further embodiment the tape dispenser is rotated in a first rotational direction and a second rotational direction opposite the first rotational direction. The tape dispenser is rotated in the first rotational direction to wrap the free end of the tape around the wire harness to securely attach the tape to the wire harness. The tape dispenser is rotated in the second rotational direction and simultaneously the taping head is moved along a length of the wire harness to wrap a desired section of the wire harness with the tape.

According to a further embodiment after the desired section of the wire harness is wrapped with the tape the taping head is moved away from the wire harness to position the tape against the anvil for clamping and also cutting the tape with the clamping element.

According to a further aspect of the disclosure, a system comprises at least one docking unit and at least one tape dispenser, the tape dispenser having a mouth and a mandrel for receiving a tape roll, wherein the tape dispenser is releasably supported on the docking unit.

The system of this embodiment may be accomplished with the above described tape dispenser or taping head to further reduce the cycle time for replacing a tape roll. In the above system the tape dispenser can be equipped with a new tape roll that is received by the mandrel. For providing the taping head with a new tape roll, the tape dispenser having a depleted tape roll can be removed from the taping head by actuating the quick-release coupling. Thereafter, the base body can be moved to the docking unit to be coupled to a further tape dispenser having a new tape roll. Since the further tape dispenser is supported on the docking unit, the base body can be coupled with the further tape dispenser supported in the docking unit in a fast and reliable manner.

According to an embodiment, the system comprises a locking device for releasably securing the tape dispenser on the docking unit. This contributes to automatically couple a tape dispenser to a base body of the taping head.

According to a further embodiment, the docking unit comprises an actuator configured to actuate a latch of the tape dispenser. The actuator may be used to automatically couple the base body of the taping head and the tape dispenser such that the base body may be removed from the docking unit with the tape dispenser being latched to the base body.

According to a further embodiment, the docking unit comprises an actuator configured to displace the tape dispenser supported on the docking unit. Such displacement can be used to move or shift the tape dispenser in relation to the base body with the base body not being moved. If the taping head is being handled by a manipulator, such as a robot arm, the robot arm can be maintained stationary at a constant position with the tape dispenser being displaced relative to the base body by means of the actuator. This allows to provide an engagement between the base body and the tape dispenser without the necessity of programming a further movement of the robot arm. The displacement of the tape dispenser that is supported on the docking unit may be comparatively small, such as some millimeters, and the actuator may displace the tape dispenser in a very short period of time with high accuracy. This is in contrast to a movement of an end of a robot arm, forming the end of a comparatively long lever.

According to a further embodiment, the docking unit comprises a base and a support slideably received on the base. In this embodiment, the tape dispenser may be placed on the support and be slideably shifted with regard to the base by means of the actuator.

According to a further embodiment, the docking unit comprises a clamping element configured to clamp a free end of a tape. By means of the clamping unit the tape of a new tape roll of a tape dispenser supported on the docking unit can be clamped in order to hold the free end of the tape in a defined position. After the base body of a taping head has been coupled to the tape dispenser on the docking unit, a clamping element of the taping head may be used to clamp the tape thereby fixing the free end of the tape at the tape dispenser. Thereafter, the tape can be cut between the clamping element of the taping head and the clamping element of the docking unit, and the taping head may be removed from the docking unit together with the tape dispenser latched to the base body.

According to an embodiment, the docking unit of the system may comprise a sensor configured to sense the presence of the tape dispenser on the docking unit. Such sensor allows an automatically controlled operation of the system.

According to a further embodiment, the system comprises at least two docking units that are mounted on a rotatable platform. In this embodiment, one docking unit can be used to provide a tape dispenser with a new tape roll and to guide the free end of the new tape roll along its predefined path within the tape dispenser. The second docking unit can be used to receive and support a second tape dispenser with a depleted tape roll. After such tape dispenser has been placed on the second docking unit, the platform may be rotated to interchange the positions of the two tape dispensers such that the tape dispenser with a new tape roll may be coupled to the base body in a very fast manner.

According to a further aspect of the disclosure, a method of taping a wire harness using a system as described in this application is disclosed. The method comprises the following steps, in particular in the indicated order: placing a tape roll on the mandrel of the tape dispenser, placing the tape dispenser on the docking unit, coupling a taping head and the tape dispenser, removing the taping head from the docking unit, and applying tape from the tape roll to the wire harness. By performing the above method steps, the docking unit can be used to prepare a tape dispenser with a new tape roll and to quickly couple the base body of a taping head and the tape dispenser to tape a wire harness. The tape dispenser may comprise one or more features as disclosed in this application.

BRIEF DESCRIPTION OF THE DRAWINGS

The present invention is now described, by way of example with reference to the accompanying drawings, in which.

DETAILED DESCRIPTION

Figure 1:
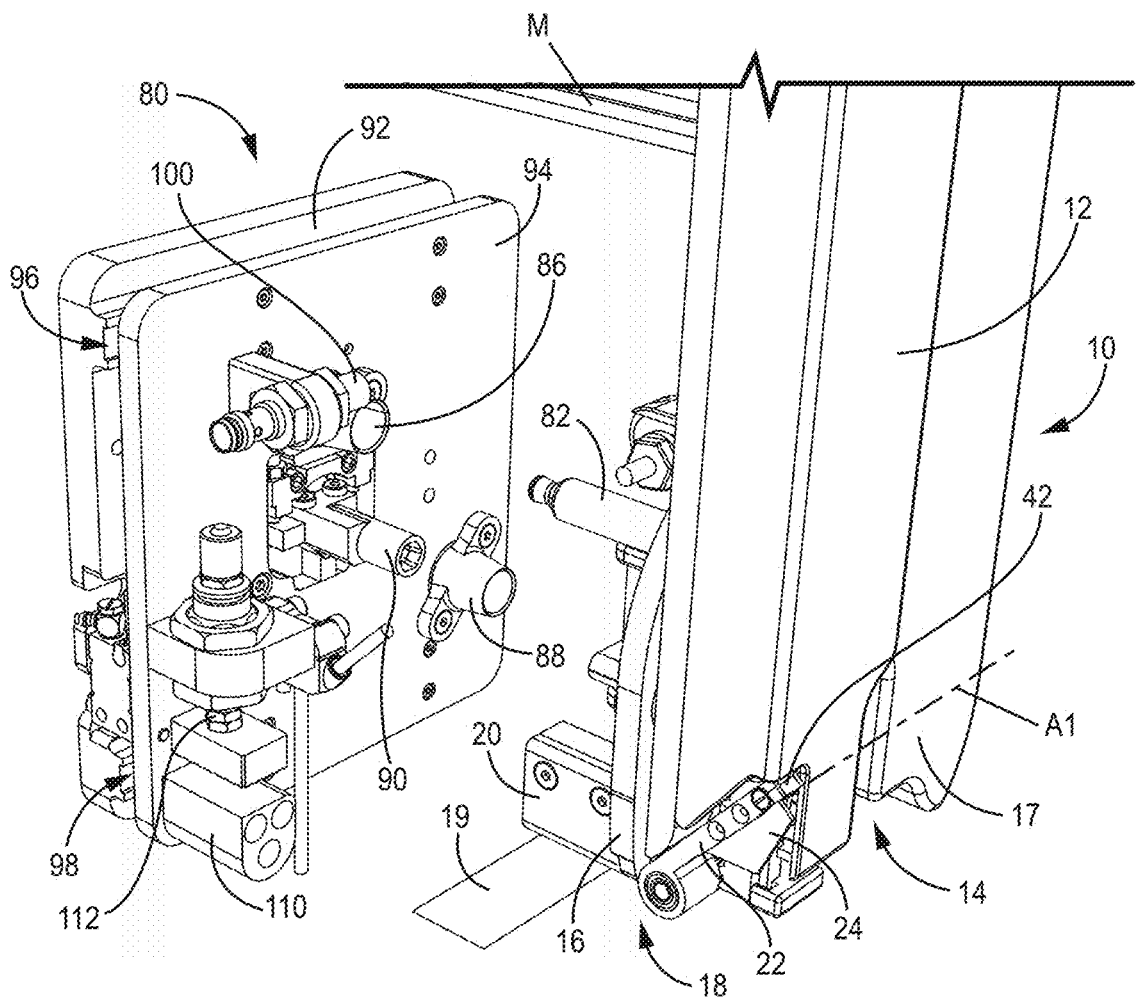
FIG. 1 is an isometric view of a taping head and a docking unit according to some embodiments.

FIG. 1 depicts a taping head 10 for taping a wire harness (not shown) that comprises a base body 12 and a tape dispenser 16. The base body 12 has a mouth 14 for receiving the wire harness. The mouth 14 has the shape of a broad slit which extends to an outer edge of the base body 12 with a dead end of the slit having a semi-circular shape. In other words, the mouth 14 forms a generally U-shaped slot in the base body 12.

Figure 2:
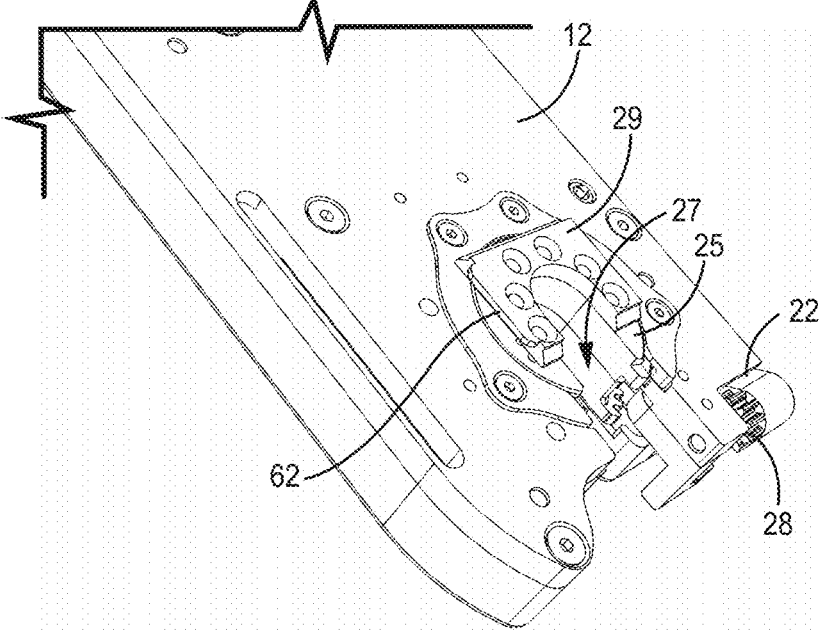
FIG. 2 is an isometric view of a base body of the taping head of FIG. 1 according to some embodiments.

The tape dispenser 16 is configured to rotate a tape roll 17 (FIG. 3) of e.g., adhesive tape around a center of the mouth 14. The tape dispenser 16, which also comprises a mouth 15 (FIG. 4) having the same general shape as the mouth 14 of the base body 12, is rotated around the center by means of a motor M mounted to the base body 12. The motor M rotates a circular disc 25 (FIG. 2) that is supported in the base body 12 and has a U-shaped opening 27. A mounting plate 29 is connected to the circular disc 25. The mounting plate 29 forms part of a quick-release coupling that is configured to couple the tape dispenser 16 to the base body 12 as described hereafter in more detail.

When the tape dispenser 16 is rotated relative to the base body 12, the tape roll 17 is also rotated around the center. If a wire harness is placed at the position of the center of the mouths 14 and 15, tape 19 from the tape roll 17 can be wrapped around the wire harness by rotating the tape dispenser 16 relative to the base body 12.

Figure 3:
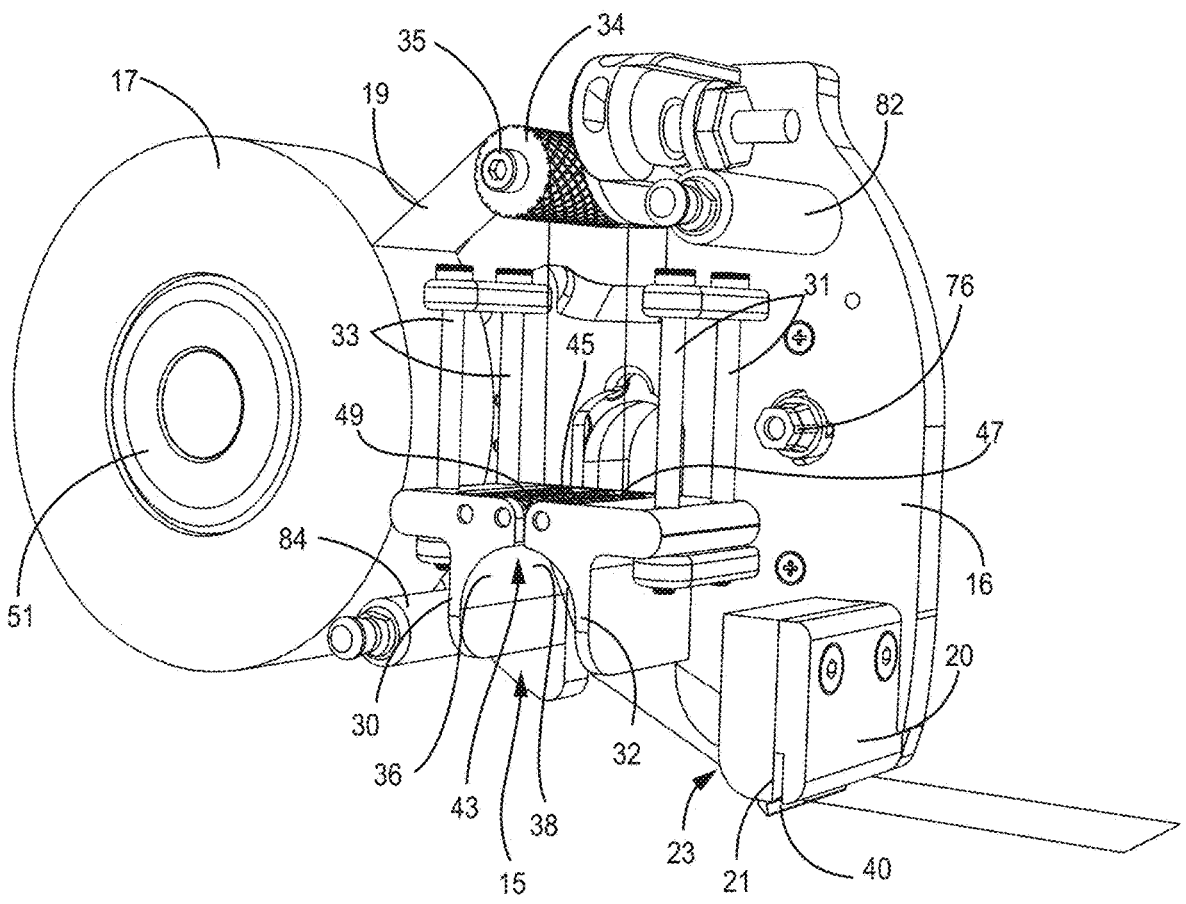
FIG. 3 is an isometric view of the tape dispenser of the taping head of FIG. 1 according to some embodiments.

As shown in FIG. 3, a free end of the tape 19 is unwound from the tape roll 17 that is rotatably supported on a mandrel 51 of the tape dispenser 16 and the free end of the tape 19 is guided along a predefined path by means of a guide roll 34 which is pivotally supported on a roll holder 35 mounted on the tape dispenser 16.

For supporting and accommodating the wire harness in the mouths 14 and 15, the tape dispenser 16 has a spring-loaded receptacle comprising two members 30, 32. Due to the two members 30, 32 the receptacle forms a gap or slot 43 (FIG. 3) for feeding the tape 19 therethrough. The members 30 and 32 of the receptacle can be linearly shifted along a pair of rods 31 and 33. The rods 31 and 33 are arranged in parallel to each other and each member 30, 32 of the receptacle is spring-loaded by means of springs (not shown). Accordingly, if the taping head 10 is positioned next to a wire harness and pushed against the wire harness, the members 30, 32 of the receptacle will be pushed against the force of the springs until the wire harness is located at the center of the mouths.

Figure 4:
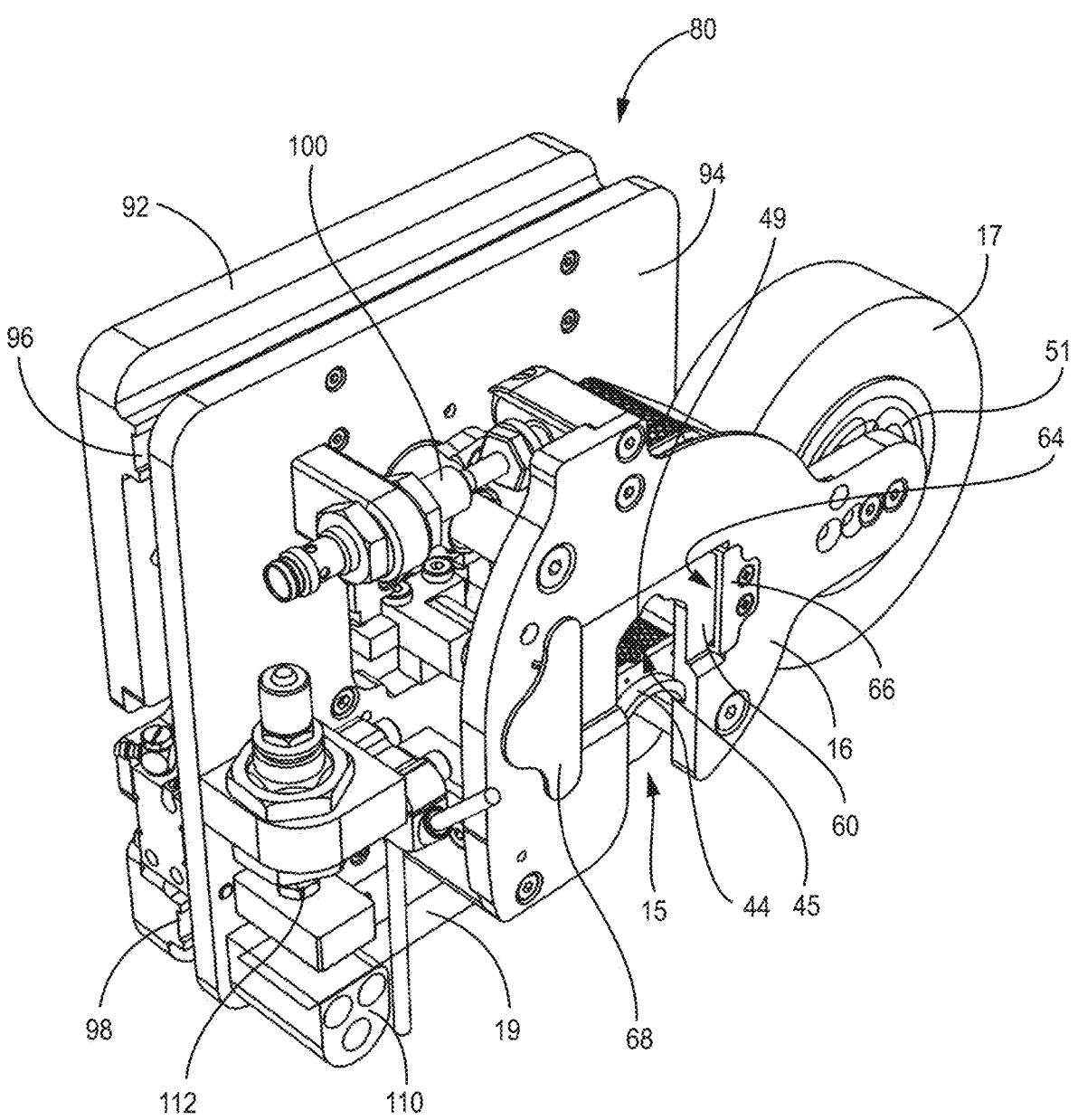
FIG. 4 is an isometric view of the tape dispenser of FIG. 3 placed in the docking unit of FIG. 1 according to some embodiments.

Both members 30, 32 may be integrally formed and be connected by means of a bridge 44 (FIG. 4). The members 30 and 32 of the receptacle each comprise an inner wall 36, 38 which is concavely curved such that the shape of the walls corresponds to the outer shape of the wire harness. Furthermore, in the region of the gap 43 both members 30 and 32 comprise a rounded edge for glidingly guiding the tape 19. According to an embodiment, the rounded edge of each member 30, 32 is realized by means of two rollers 45 and 47 having a textured surface that prevents a sticking of the tape 19 to the receptacle and that supports a smooth guidance of the tape 19 through the slot 43. In this embodiment, the two rollers 45 and 47 are positioned in parallel at both sides of the slot 43.

As depicted in FIG. 3, the receptacle comprising the members 30 and 32 can be pushed upwards against the force of springs to slide along the rods 31 and 33. This may result in a loop being formed by the tape 19 between the receptacle and the guide roll 34. To avoid that such loop of the tape 19 adheres to the receptacle, a third roller 49 is provided in parallel and adjacent to the roller 45. The third roller 49 does also have a textured surface against an adhering of the tape 19.

As a matter of course, the receptacle having one or more rollers 45, 47 and 49 as described above can be used in an advantageous manner for any taping head having a tape dispenser, be it with or without a quick release coupling.

The taping head 10 has a clamping unit 18 (FIG. 1) in order to clamp and also cut the free end of the tape 19. The clamping unit 18 comprises an anvil 20 and a clamping element 22. The anvil 20 is a block-like element fixedly mounted to the rotatable tape dispenser 16 and the clamping element 22 comprises a rotatable lever mounted to the base body 12. The anvil 20 is rigidly connected to the rotatable tape dispenser 16 and is not movable relative thereto. Accordingly, when the rotatable tape dispenser 16 is rotated relative to the base body 12, the anvil 20 is rotated relative to the clamping element 22 that is mounted to the base body 12. The free end of the tape 19 can be clamped between the anvil 20 and the clamping element 22 as shown in FIG. 1. The rotatable lever can be rotated about an axis A1 which extends in parallel to the extension of the base body 12 to rotate the clamping element 22 e.g., about at least 180° from the position shown in FIG. 1 (open position) to a closed position (closed or clamping position).

For rotating the clamping element 22 a gear rod is provided which can be linearly shifted by means of an actuator. The linear movement of the gear rod is converted into a rotational movement by means of a gear wheel 28 (FIG. 2) provided on the clamping element 22 such that the clamping element 22 rotates about the axis A1 if the actuator is actuated to shift the gear rod.

As shown in FIG. 1, the clamping element 22 comprises a substantially triangular cutting blade 24 and a slit 42 whereas the anvil 20 comprises a slot 21 (FIG. 3) for receiving the cutting blade 24 and a protrusion 40 for clamping the tape 19. The protrusion 40 is received in the slit 42 of the clamping element 22 when the clamping element 22 has reached the closed position. The tape 19 will be held and clamped between the protrusion 40 of the anvil 20 and the slit 42 of the clamping element 22. However, the tape 19 is not cut by the protrusion 40. The cutting is achieved by the cutting blade 24 received in the slot 21 of the anvil 20. The protrusion 40 and the slit 42 are positioned closer towards the mouths 14 and 15 and the slot 21 and the cutting blade 24 are positioned farther away from the mouths 14 and 15 such that when the clamping element 22 is in the closed position the tape 19 is cut, but the free end of the tape 19 is held and clamped between the protrusion 40 and the slit 42.

As shown in FIG. 3 a contact surface 23 of the anvil 20 is located adjacent an inlet of the mouth 15 of the tape dispenser 16 such that the free end of the tape 19 is fixed at a location remote from the mouth 15 to avoid interference with a wire harness.

The base body 12 is provided with a quick mount 13 (FIG. 6) for mounting the base body 12 to a robot arm. Thereby, the positioning of the taping head 10 can be performed by means of a robot in an effective manner. Further, it is possible to move the taping head 10 along the length of a wire harness during the taping process such that a desired section of the wire harness is wrapped with the tape 19.

When a taping process is initiated, the clamping element 22 is in the closed position such that the free end of the tape 19 is held between the clamping element 22 and the anvil 20. The taping head 10 is located above the wire harness and moved towards the wire harness such that the wire harness gets in touch with the walls 36, 38 of the members 30, 32 of the receptacle. As the taping head 10 is moved further downwards against the wire harness, the members 30 and 32 are pushed upwards against the forces of the springs such that the tape 19 gets in contact with the wire harness. After the wire harness is fully received in the mouths 14 and 15, the actuator is actuated to rotate the clamping element 22 from the closed position to the open position shown in FIG. 1, thereby releasing the free end of the tape 19. The tape dispenser 16 is then rotated around the center in a first rotational direction whereby the free end of the tape 19 is wrapped around the wire harness in the first rotational direction. During this rotation the inner wall 38 of the receptacle presses the free end of the tape 19 against the wire harness while wrapping the free end around the wires. During this process step the taping head 10 is not or not substantially moved in a lengthwise direction (parallel to the wire harness). Once the free end of the tape 19 is wrapped around the wire harness a sufficient amount to secure the tape 19 to the wire harness, the rotation of the tape dispenser 16 in the first rotational direction is stopped. The tape dispenser 16 is then rotated around the center in a second rotational direction, opposite the first rotational direction, whereby the tape 19 is wrapped around the wire harness in the second rotational direction. Simultaneously with the rotation of the tape dispenser 16 in the second rotational direction, the taping head 10 is moved along a length of the wire harness such that a desired section of the wire harness is wrapped with the tape 19.

After the desired section of the wire harness has been wrapped with the tape 19, the taping head 10 is moved away from the wire harness which causes a length of tape 19 to extend between the wire harness and the taping head 10. The taping head 10 is then moved into a position such that the tape 19 is guided over the contact surface 23 of the anvil 20 with the tape 19 being slightly tensioned such that no loops or undulations occur. Thereafter, the clamping element 22 is rotated about the axis A1 by means of the actuator and the tape 19 is cut and simultaneously clamped between the clamping element 22 and the anvil 20.

The taping head described above is very compact and light weight. The taping head can be used with standard taping rolls with tape that is adhesive on one side or on both sides and the taping process can be done automatically by means of a robot. The clamping and the cutting of the tape is done automatically.

The tape dispenser 16 is mounted to the base body 12 by means of a quick-release coupling to allow an operator to easily swap out the tape dispenser 16 with another tape dispenser 16 once the tape roll 17 is empty or if maintenance needs to be performed. The quick-release coupling comprises the mounting plate 29 that is mounted to the rotatable disc 25 of the base body 12 on the one hand and a quick-release mechanism to couple the mounting plate 29 with the tape dispenser 16 on the other hand. As shown in FIG. 4, the tape dispenser 16 has a rectangular recess 60 configured in its shape and size to receive the mounting plate 29. Further, one side edge of the mounting plate 29 is provided with a protruding web 62 (FIG. 2) that is shaped to fit into an undercut 64 (FIG. 4) of the recess 60. Accordingly, if the mounting plate 29 is inserted into the recess 60 and is thereafter shifted to the right hand side (in FIG. 4), the protruding web 62 is kept in the undercut 64 by means of a small cover plate 66 (FIG. 4).

Figure 5A:
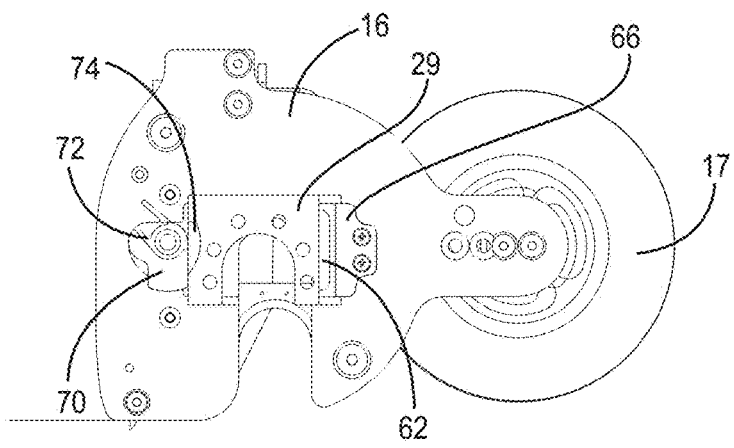
FIGS. 5A to 5C are rear plan views of the tape dispenser of FIG. 3 with a mounting plate of the base body inserted in a recess at different positions according to some embodiments.

As the mounting plate 29 could still be shifted within the recess 60, a latch mechanism to latch the mounting plate 29 with the tape dispenser 16 is provided that is shown in more detail in FIGS. 5A bis 5C.

Figure 5B:
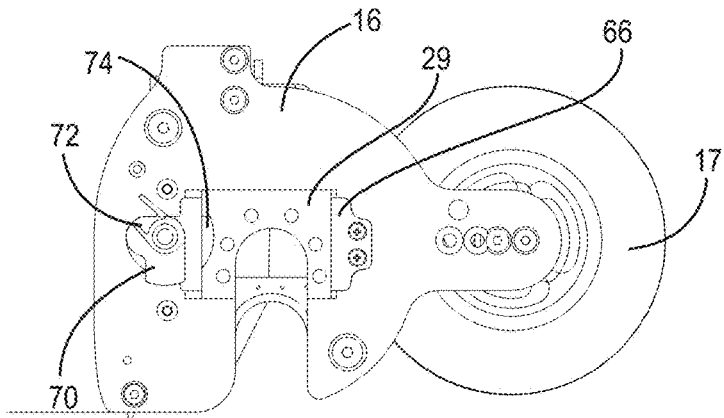

FIGS. 5A bis 5C depict a rear plan view onto the tape dispenser 16 with a cover 68 (FIG. 4) removed to better illustrate the latch mechanism for latching the mounting plate 29 with the tape dispenser 16. The latch mechanism comprises a rotatable latch lever 70 that is spring-loaded by means of a spring 72. The latch lever 70 can be turned from its biased position shown in FIGS. 5A and 5B in a counter-clockwise direction into the position shown in FIG. 5C. From this position, the latch lever 70 can be turned in a clockwise direction against the force of the spring 72 into the position shown in FIGS. 5A and 5B. In the position of the latch lever 70 shown in FIG. 5C the latch lever 70 engages an undercut 74 of the mounting plate 29 thereby locking and latching the mounting plate 29 within the recess 60 of the tape dispenser 16.

To actuate the latch lever 70 of the quick-release coupling, a quick-release pin 76 (FIG. 3) is provided that can be actuated (turned) e.g., by means of a hand tool.

Figure 5C:
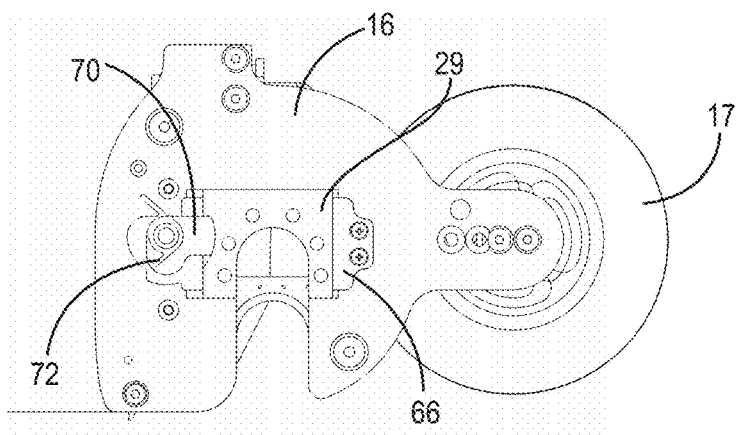

After a tape dispenser 16 is coupled and latched to the base body 12 of the taping head 10, the mounting plate 29 and the latch lever 70 adopt their positions shown in FIG. 5C. In order to release the tape dispenser 16 from the base body 12, the quick-release pin 76 must be turned (in FIG. 3) in a counter-clockwise direction against the force of the spring 72 such that the latch lever 70 adopts the position shown in FIG. 5B. Thereafter, the tape dispenser 16 must be shifted laterally (to the left in FIG. 3 and to the right in FIG. 5B) to reach the position shown in FIG. 5A with respect to the mounting plate 29 (that is mounted to the base body 12 not shown in FIGS. 5A-5C). Thereafter, the tape dispenser 16 can be removed.

For coupling a tape dispenser 16 with the base body 12 the same procedure has to be applied in a reverse order. First, the tape dispenser 16 is moved towards the base body 12 (or vice versa) until the mounting plate 29 is located in the recess 60 of the tape dispenser 16 in the position shown in FIG. 5A. Thereafter, the tape dispenser 16 is moved laterally with regard to the base body 12 (or vice versa) to displace the mounting plate 29 in the position shown in FIG. 5B. When doing so, the spring 72 automatically urges the latch lever 70 into the position shown in FIG. 5C thereby interconnecting and latching the tape dispenser 16 and the base body 12.

Figure 6:
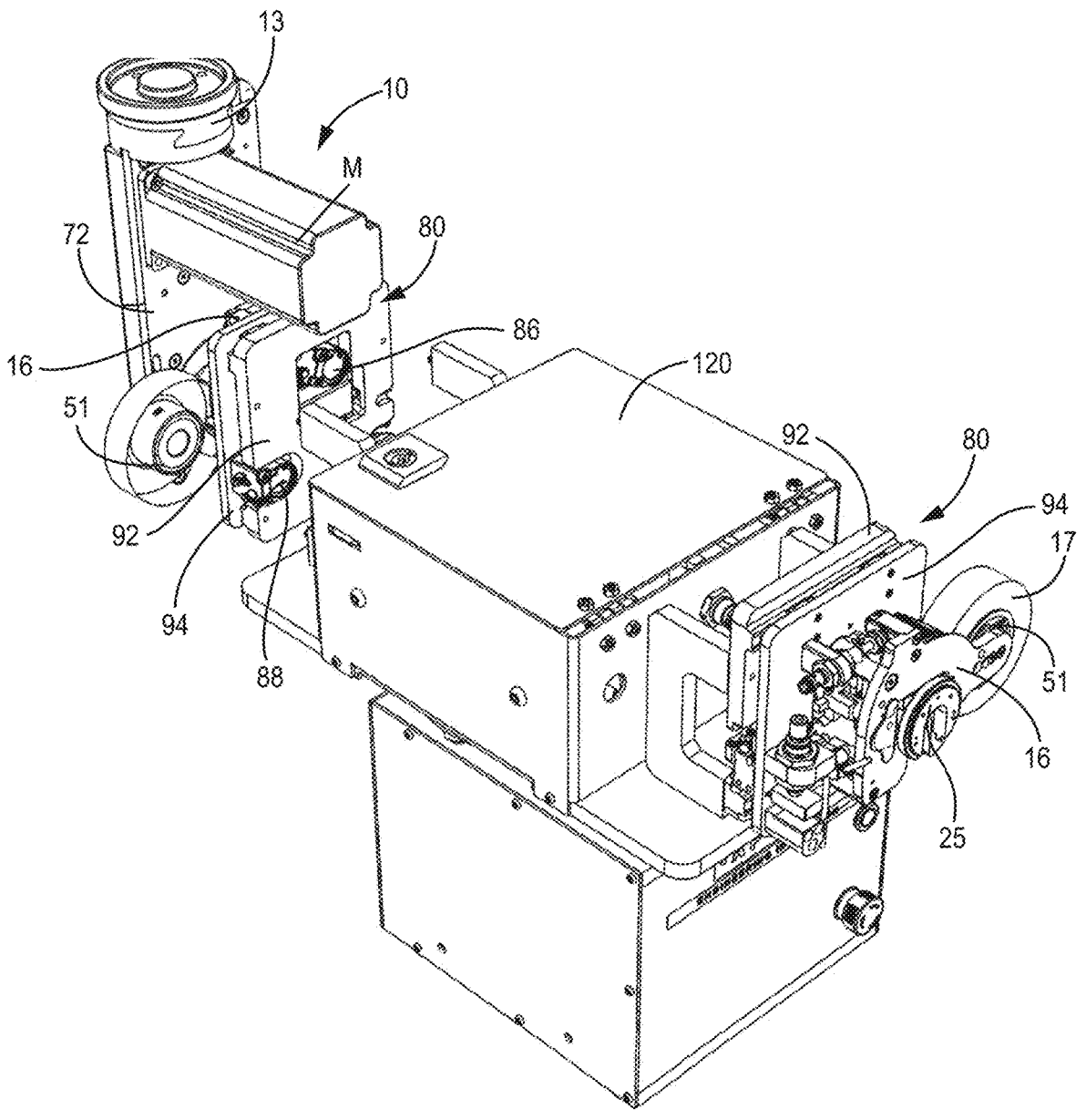
FIG. 6 is an isometric view of a system comprising two docking units mounted on a rotatable platform according to some embodiments.

In order to facilitate the replacement of a tape roll 17 on the tape dispenser 16 a system is provided that comprises at least one tape dispenser 16 having a mouth 15 and a mandrel 51 for receiving a tape roll 17, wherein the system further comprises a docking unit 80 (see FIGS. 1, 4 and 6). The docking unit 80 is configured and configured to releasably support a tape dispenser 16 on the docking unit such as that shown in FIG. 4.

To interconnect a tape dispenser 16 with a docking unit 80 the tape dispenser 16 is provided with e.g., two studs 82, 84 that are configured to fit in corresponding clamping receptacles 86 and 88 of the docking unit 80. The heads of the studs 82 and 84 can be fixed in the clamping receptacles 86 and 88, e.g., by means of pneumatic actuators. Further, the clamping receptacles 86 and 88 have conical (funnel-shaped) openings to facilitate the insertion of the studs 82 and 84 into the clamping receptacles 86 and 88. After the studs 82 and 84 are inserted and locked or clamped in the clamping receptacles 86 and 88, the tape dispenser 16 is securely held in the position shown in FIG. 4 in the docking unit 80 to facilitate maintenance or replacement of the tape roll 17.

In order to automatically actuate the latch lever 70 of the tape dispenser 16, the docking unit 80 is further provided with a rotatable key 90 configured to releasably engage the quick-release pin 76 of the tape dispenser 16. The key 90 can be rotated electrically or pneumatically to rotate the latch lever 70 from the position shown in FIG. 5C into the position shown in FIGS. 5A and 5B against the force of the spring 72.

In order to automatically displace a tape dispenser 16 supported on the docking unit 80 in a lateral direction, the docking unit 80 comprises a base 92 and a support plate 94 that is slideably received on the base 92. As shown in FIGS. 1 and 4, the support plate 94 is supported on the base 92 by means of two rails 96 and 98. By means of an actuator, the support plate 94 can be linearly shifted in a lateral direction to displace a tape dispenser 16 from the position shown in FIG. 5A into the position shown in FIG. 5C (assuming that the mounting plate 29 remains stationary). By means of this mechanism it is possible to lock and unlock a tape dispenser 16 with regard to the base body 12 in a very short period of time with high accuracy.

To load a tape dispenser 16 with a depleted tape roller 16 into the docking unit 80, the taping head 10 is moved towards the docking unit 80 (e.g. by means of a robot arm) with the studs 82 and 84 being inserted into the clamping receptacles 86 and 88. After a sensor 100 of the docking unit 80 has sensed that the tape dispenser 16 has reached its final position in the docking unit 80, the clamping receptacles 86 and 88 are activated and the key 86 is turned to move the latch lever 70 from the position shown in FIG. 5C into the position shown in FIG. 5A. Thereafter, the support plate 94 is shifted with regard to the base 92 to move the tape dispenser 16 in a lateral direction. Thereafter, the protruding web 62 of the mounting plate 29 is free from the undercut 64 and the base body 12 with the mounting plate 29 can be removed from the docking unit 80.

In a similar manner a tape dispenser 16 with a new tape roll 17 supported on the docking unit 80 can be connected to a base body 12. For doing so, the base body 12 will be moved towards the tape dispenser 16 supported on the docking unit 80 until the support plate 29 of the base body 12 is accommodated in the recess 60. Thereafter, the base body 12 (and the mounting plate 29) are not further moved but the support plate 94 is shifted relative to the base 92 to laterally move the tape dispenser 16 from the position shown in FIG. 5A into the position shown in FIGS. 5B and 5C thereby simultaneously moving the latch lever 70 into its locked position (FIG. 5C). Thereafter, the taping head 10 can be removed from the docking unit 80 after releasing the clamping receptacles 86 and 88.

As further depicted in FIGS. 1 and 4 the docking unit 80 further comprises a clamping element configured to clamp a free end of a tape 19. The clamping element is comprised of a stationary anvil 110 and a clamping actuator 112, both mounted on the support plate 94. As depicted in FIG. 4, the free end of the tape 19 (of a new tape roll 17) can be guided along its path in the tape dispenser 16 (FIG. 3), wherein the free end of the tape 19 can be led through the gap between the anvil 110 and the clamping actuator 112. Thereafter, the clamping actuator 112 can be actuated such that the free end of the tape 19 can be tensioned because it is clamped between the clamping actuator 112 and the anvil 110.

After a base body 12 has been coupled to the tape dispenser 16 shown in FIG. 4, the clamping unit 18 of the taping head can be actuated to clamp and cut the tape 19 between the anvil 110 of the docking unit 80 and the anvil 20 of the taping head 10. Thereafter, the taping head 10 can be removed from the docking unit 80 to tape a wire bundle or a wire harness.

To swap out a tape dispenser 16 having a depleted tape roll with another tape dispenser 16 in an even more efficient, reliable and fast way, a plurality of docking units 80 can be mounted on a movable, e.g., rotatable platform. FIG. 6 shows an example of such an embodiment wherein two docking units 80 are mounted on opposite sides of a platform 120 that is rotatable about a vertical axis. Each docking unit 80 is mounted to the platform 80 by means of two U-shaped brackets wherein the left docking unit of FIG. 6 is shown at a distance to the corresponding brackets for illustrative purposes only. Furthermore, the tape dispenser 16 in the right docking unit 80 of FIG. 6 is also shown only for illustrative purposes, comprising the circular disc 25 of the base body 12. It should be clear that the circular disc 25 is mounted to the base body 12 but does not form a part of the tape dispenser 16.

With the above apparatus, one docking unit 80 can be used to replace a depleted tape roll with a new tape roll wherein the further docking unit 80 can be kept empty to receive a tape dispenser with a depleted tape roll. After the base body and the tape dispenser have been separated, the platform can be rotated by 180 such that the positions of the two tape dispensers on the platform are interchanged. Thereafter, the base body 12 can be coupled with the tape dispenser having a new tape roll without substantial movements.

With the above system and apparatus, a wire harness can be taped in an efficient manner by placing a tape roll 17 on the mandrel 51 of the tape dispenser 16, placing the tape dispenser 16 on the docking unit 80 and coupling the base body 12 of the taping head 10 and the tape dispenser 16. Thereafter, the taping head 10 can be removed from the docking unit 80 and tape 19 from the tape roll 17 can be applied to the wire harness. When the tape of the tape roll is depleted, the tape dispenser 16 can be returned to the docking unit 80 and in the docking unit 80 the tape dispenser 16 can be uncoupled from the base body 12 of the taping head 10. Thereafter, the base body 10 can be moved to a second docking unit wherein a second tape dispenser 16 with a new tape roll 16 can be coupled to the base body 10 in the second docking unit.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A system, comprising:
   at least one docking unit; and
   at least one tape dispenser, wherein the tape dispenser has a mouth and a mandrel for receiving a tape roll and wherein the tape dispenser is releasably supported on the docking unit, the tape dispenser being coupled to a base body by means of a quick-release coupling, the base body having a quick mount configured to mount the base body to a robot arm.

2. The system according to claim 1, further comprising a locking device for releasably securing the tape dispenser on the docking unit.

3. The system according to claim 1, wherein the docking unit comprises an actuator configured to actuate a latch of the tape dispenser.

4. The system according to claim 1, wherein the docking unit comprises an actuator configured to displace the tape dispenser supported on the docking unit.

5. The system according to claim 1, wherein the docking unit comprises a base and a support slideably received on the base.

6. The system according to claim 1, wherein the docking unit comprises a clamping element configured to clamp a free end of a tape.

7. The system according to claim 1, wherein the docking unit comprises a sensor configured to sense presence of the tape dispenser on the docking unit.

8. The system according to claim 1, wherein at least two docking units are mounted on a rotatable platform.

* * * * *